United States Patent [19]

Canevall

[11] Patent Number: 4,776,982
[45] Date of Patent: Oct. 11, 1988

[54] PROCEDURE FOR TEMPORARY STORAGE OF RADIOACTIVE MATERIAL

[76] Inventor: John Canevall, 19, Kungsholmsgatan, Stockholm, Sweden

[21] Appl. No.: 51,240

[22] Filed: May 12, 1987

Related U.S. Application Data

[63] Continuation of Ser. No. 751,184, filed as PCT SE83/00408 on Nov. 22, 1983, published as WO85/02486 on Jun. 6, 1985, abandoned.

[51] Int. Cl.⁴ .................. G21C 19/00; G21D 9/00; G21F 9/34
[52] U.S. Cl. .................................. 252/633; 376/261; 376/272; 60/644.1
[58] Field of Search .............. 376/272, 273, 276, 260, 376/261; 250/506.1, 507.1; 414/146; 252/633; 60/203.1, 644.1

[56] References Cited

U.S. PATENT DOCUMENTS

| | | | |
|---|---|---|---|
| 4,366,114 | 12/1982 | Kuhnel et al. | 376/272 |
| 4,404,165 | 9/1983 | Hesky et al. | 376/272 |
| 4,481,165 | 11/1984 | Anderson et al. | 376/272 |
| 4,525,324 | 6/1985 | Spilker et al. | 376/272 |
| 4,678,624 | 7/1987 | Lahr et al. | 376/272 |
| 4,681,706 | 7/1987 | Mallory et al. | 376/272 |
| 4,701,280 | 10/1987 | Canevall | 376/272 |

FOREIGN PATENT DOCUMENTS

| | | | |
|---|---|---|---|
| 0039785 | 11/1981 | European Pat. Off. | 376/272 |
| 2209983 | 12/1972 | France. | |
| 2388380 | 4/1977 | France. | |
| 2449952 | 12/1979 | France. | |
| 2929467 | 1/1981 | Fed. Rep. of Germany | 376/272 |
| 3030941 | 4/1981 | Fed. Rep. of Germany. | |
| 3014252 | 10/1981 | Fed. Rep. of Germany | 376/272 |
| 3143865 | 5/1983 | Fed. Rep. of Germany | 376/272 |
| 3206705 | 9/1983 | Fed. Rep. of Germany | 376/272 |
| 402176 | 12/1976 | Sweden. | |
| 2090461 | 7/1982 | United Kingdom. | |
| 2096301 | 10/1982 | United Kingdom | 376/272 |

Primary Examiner—Deborah L. Kyle
Assistant Examiner—Daniel Wasil
Attorney, Agent, or Firm—Banner, Birch, McKie & Beckett

[57] ABSTRACT

The invention is a method for the storage in a storage room (9) of radioactive material and particularly for the temporary storage of radioactive nuclear fuel from nuclear reactors and of non-reprocessed radioactive material.

A remote-controlled robot arrangement, comprising a transfer robot (4) and a lifting and carrying robot (5), is designed to fit into a lift (8) for moving the material from ground level to the storage room, to transfer the material into double-walled containers (1), and to carry stacks of containers. The material is transferred by the transfer robot (4) to and from the double-walled containers (1). The containers are provided with safety arrangement (2) with three safety locks to prevent the radioactive material from escaping during transfer.

Heat removal from the double-walled containers (1) is effected by means which make the heat available for practical use and maintain the correct temperature in the containers.

5 Claims, 2 Drawing Sheets

PROCEDURE FOR TEMPORARY STORAGE OF RADIOACTIVE MATERIAL

This application is a continuation of Ser. No. 751,184, filed as PCT SE83/00408 on Nov. 22, 1983, published as W085/0248 on Jun. 6, 1985, now abandoned.

BACKGROUND OF THE INVENTION

The invention "NAGIVA Disposal Process" is a method for the storage of radioactive material, and particularly for the temporary storage of radioactive nuclear fuel from nuclear reactors and non-reprocessed radioactive material.

The spent fuel contains products which are highly radioactive and it is therefore necessary to keep it separated from living organisms.

Spent non-reprocessed fuel can be stored temporarily for a short or long time pending a decision to reprocess the material or to move it to permanent storage.

The heat evolution of the fuel rods increases when they are lifted out of the reactor and, in the present state of the art, they must be placed in a pool for cooling. After this initial cooling it has been proposed that the spent fuel be converted into solid form for temporary container storage. It has also been proposed that the fuel be mixed with liquid glass to solidify it.

The present invention provides a safe and practical method for the handling and storage of spent, nonreprocessed fuel from nuclear reactors.

BRIEF DESCRIPTION OF THE DRAWINGS

The invention is explained with reference to descriptions and drawings.

DETAILED DESCRIPTION OF THE INVENTION

Figure 1:
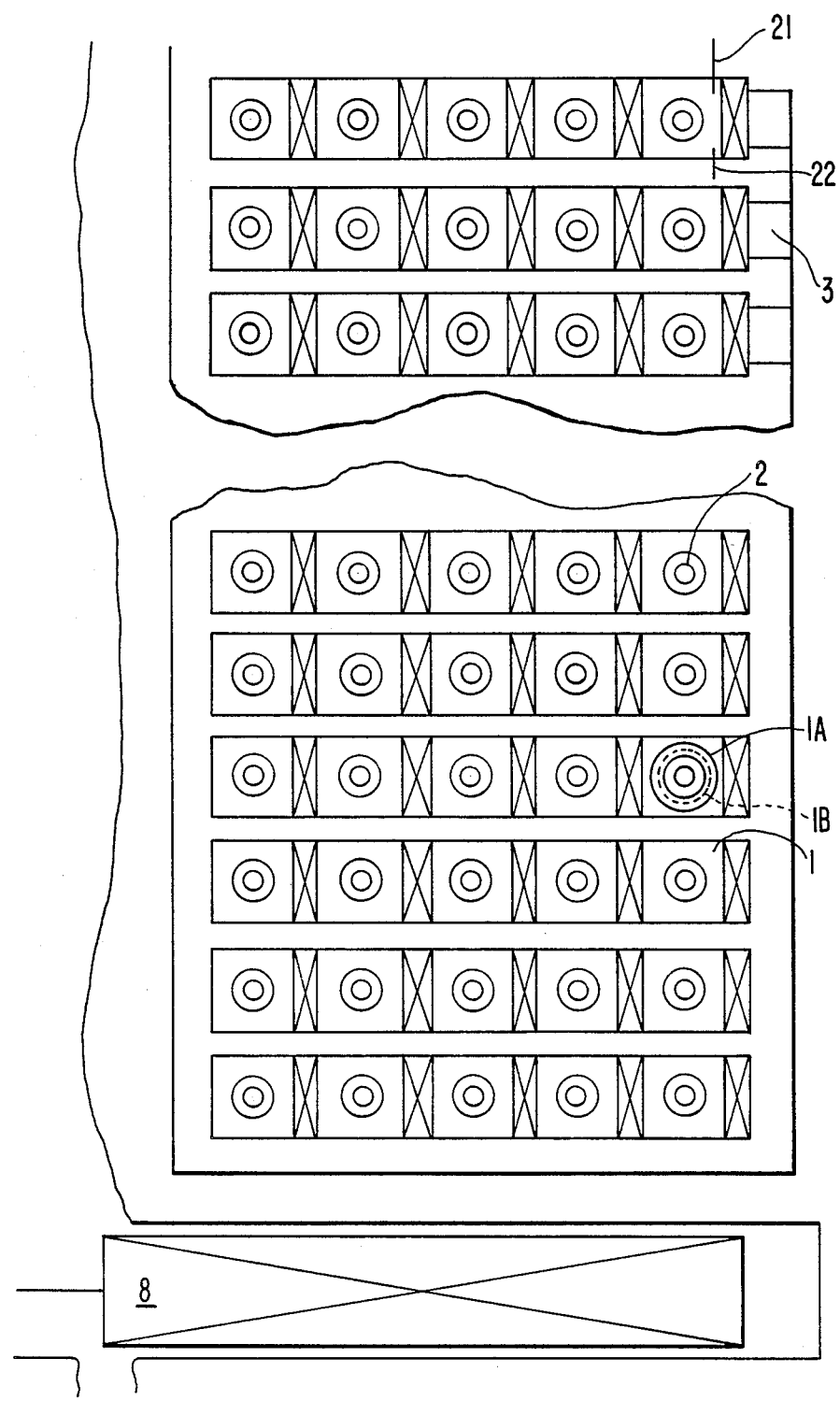
FIG. 1 represents double-walled containers in a temporary storage room.
Figure 2:
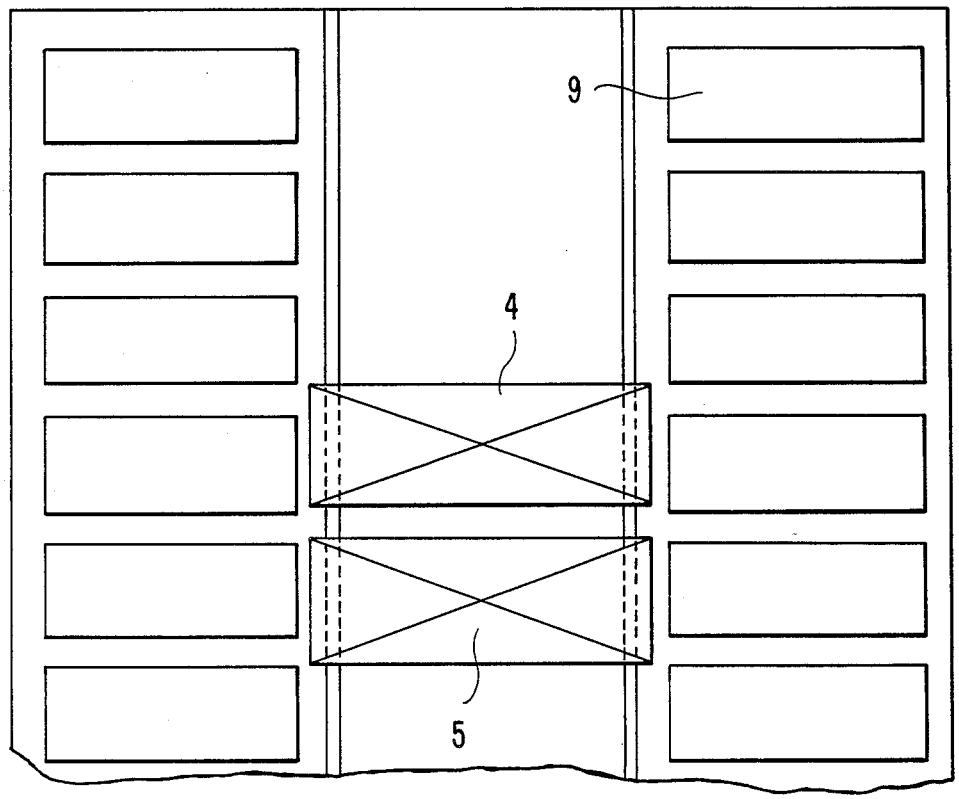
FIG. 2 represents a plan view of the storage room.
Figure 2:
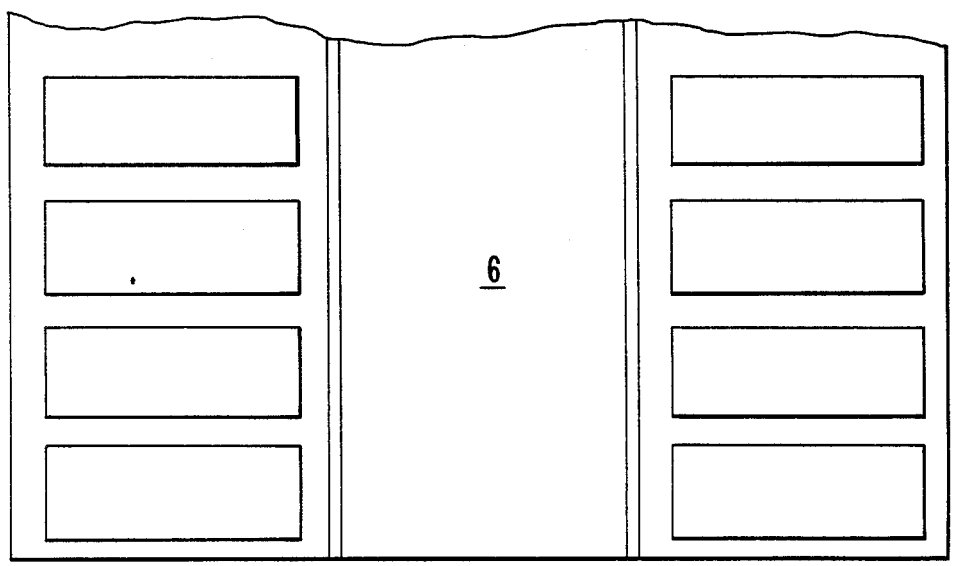

It will be easier to handle the spent fuel after it is taken out of the reactors if it is placed in an acid bath to separate the metal cans of the fuel rods from the fuel. The liquid material is then converted into pellets for direct transfer to a vehicle. The material may also be subjected to a separation process whereafter the different waste products will be stored in separate containers. Another procedure is for the fuel, with the metal cans, to be loaded directly onto the vehicle for transport to the storage place.

In an underground storage room 9, blasted out of rock 7, a rail-mounted material handling device approx. 5 meters × 5 meters in plan and 11 meters in height is arranged to run along a track 6. The material handling device consists of two sections, section 4 arranged to be raised and lowered and equipped with a transfer container for the transfer of spent fuel to and from storage containers, and a section 5 with lifting and carrying arrangements. Section 4 thus functions as a transfer device and section 5 functions as a lifting and carrying device material handling device. The material handling device is designed to fit into lift 8 for moving spent fuel from ground level down to the storage room 9, and to carry and transfer fuel to double-walled containers 1.

The double-walled containers the double walls of which are shown diagrammatically as 1A and 1B in FIG. 1, are stacked one on top of the other on a structure 3 which is designed to suit the lifting and carrying section 5. This section can, when required, run under structure 3, lift up one stack of containers, and shift it onto a structure common to both sections for transport from storage room 9.

The material of the containers and arrangements for heat removal and cooling comply with accepted engineering practice and are of types approved by the authorities.

The containers are provided with safety valve arrangements 2 with three safety locks to prevent radioactive material from escaping during transfer to or from the transfer container of section 4. Transfer is effected either by remote control or manually.

The method for heat removal to cool the radioactive material may be chosen according to the practical use the heat is to be put to, such as water heating. The heat can be removed from the space between the inner and outer walls of the containers by a heat exchange medium e.g. air, liquid or gas through inlet-outlet conduits 21 and 22, illustrated diagramatically in FIG. 1 connected to one of the containers 1. When the thermal radiation from the material decreases and there is no longer any need for heat removal or cooling, the material can be transferred into cheaper containers. The material is easily transferred from the double-walled container and moved to another storage place, e.g. after a decision to reprocess it.

The containers, which are shown in FIG. 1 as resting on a structure 3 and are adapted to lifting and carrying section 5, may alternatively be cast into concrete.

It will be apparent from the foregoing that my invention provides a safe, inexpensive, and practical means of handling and storing spent nuclear fuel. Human contact with the equipment will be negligible.

I claim:

1. A method for temporary storage of radioactive material, said method comprising:
   transferring the radioactive material from a transport vehicle to a transfer container;
   moving said transfer container with the radioactive material to a storage room;
   positioning a double-walled storage container in the storage room;
   transferring the radioactive material directly from said transfer container to the positioned double-walled storage container;
   cooling the radioactive material in the double-walled storage container by circulating a heat exchange medium through the space formed between the double walls of said double-walled storage container to conduct heat away from the material;
   utilizing the heated heat exchange medium to provide an energy source.

2. A method as in claim 1 including the step of stacking a plurality of said double-walled storage containers in said storage room.

3. A method as in claim 1 wherein the radioactive material is transferred from the transfer container to the double-walled storage container through a valve.

4. A method for temporary storage of radioactive material, said method comprising:
   transferring the radioactive material from a transport vehicle to a transfer container;
   moving said transfer container with the radioactive material to a storage room;
   providing a double-walled storage container in the storage room;

transferring the radioactive material directly from said transfer container to the doubled-walled storage container;

storing the double-walled storage container containing the radioactive material in the storage room;

cooling the radioactive material in the double-walled storage container by circulating a heat exchange medium through the space formed between the double walls of said double-walled container to conduct heat away from the material;

utilizing the heated heat exchange medium to provide an energy source; and transferring the radioactive material from the double-walled storage container to another storage container after the radioactive material has cooled in the double-walled storage container.

5. A method for temporary storage of radioactive material, said method comprising:

transferring the radioactive material from a transport vehicle to a transfer container;

arranging a plurality of double-walled storage containers at predetermined locations in a storage room;

moving said transfer container with the radioactive material to the storage room and adjacent one of the arranged double-walled storage containers;

transferring the radioactive material directly from said transfer container to the adjacent one of the double-walled storage containers;

storing the double-walled storage container containing the radioactive material in the storage room;

cooling the radioactive material in the double-walled storage container by circulating a heat exchange medium through the space formed between the double walls of said double-walled container to conduct heat away from the material;

utilizing the heated heat exchange medium to provide an energy source.

* * * * *

UNITED STATES PATENT AND TRADEMARK OFFICE
CERTIFICATE OF CORRECTION

PATENT NO. : 4,776,982

DATED : October 11, 1988

INVENTOR(S) : John Canevall

It is certified that error appears in the above-identified patent and that said Letters Patent is hereby corrected as shown below:

Column 1, line 61, after "device" (first occurrence) delete "material handling device"; and Column 1, line 65, after "containers" insert --,--.

Signed and Sealed this

Twenty-first Day of February, 1989

Attest:

DONALD J. QUIGG

*Attesting Officer*     *Commissioner of Patents and Trademarks*